US007793102B2

(12) United States Patent
Malville et al.

(10) Patent No.: US 7,793,102 B2
(45) Date of Patent: Sep. 7, 2010

(54) METHOD FOR AUTHENTICATION BETWEEN A PORTABLE TELECOMMUNICATION OBJECT AND A PUBLIC ACCESS TERMINAL

(75) Inventors: Eric Malville, Bayeux (FR); Didier Guerin, Caen (FR); Yves Thorigne, Verson (FR)

(73) Assignee: France Telecom, Paris (FR)

( * ) Notice: Subject to any disclaimer, the term of this patent is extended or adjusted under 35 U.S.C. 154(b) by 957 days.

(21) Appl. No.: 10/480,148

(22) PCT Filed: Jun. 3, 2002

(86) PCT No.: PCT/FR02/01860

§ 371 (c)(1),
(2), (4) Date: Dec. 8, 2003

(87) PCT Pub. No.: WO02/102018

PCT Pub. Date: Dec. 19, 2002

(65) Prior Publication Data

US 2004/0172536 A1     Sep. 2, 2004

(30) Foreign Application Priority Data

Jun. 8, 2001 (FR) .................................. 01 07631

(51) Int. Cl.
*H04L 29/06* (2006.01)
(52) U.S. Cl. ...................................... 713/169; 380/270
(58) Field of Classification Search ................. 713/169, 713/176
See application file for complete search history.

(56) References Cited

U.S. PATENT DOCUMENTS 5,930,804 A * 7/1999 Yu et al. ................... 707/104.1

(Continued)

FOREIGN PATENT DOCUMENTS

WO       WO 98 39875 A      9/1998

WO       WO 00 28762 A      5/2000
WO       WO 00/56105        9/2000

OTHER PUBLICATIONS

Schneier "Applied Cryptography Protocols, Algorithms, and Source Code in C" (1996).*
Menezes et al., "Handbook of Applied Cryptography", Handbook of Applied Cryptography, CRC Press Series on Discrete Mathematics and its Applications, Boca Raton, Fl., CRC Press US, 1997, XP002201354 ISBN: 0-8493-8523-7, pp. 401-402, 497-498, 546-548.

(Continued)

*Primary Examiner*—Gilberto Barron, Jr.
*Assistant Examiner*—Devin Almeida
(74) *Attorney, Agent, or Firm*—Cohen Pontani Lieberman & Pavane LLP (57) ABSTRACT

A method of mutually authenticating, firstly, a portable object (10) assigned a unique identifier (MSISDN) and including first wireless communications means and, secondly, a public access terminal (20) including second wireless communications means and telecommunications means for communicating via a telecommunications network (1). The portable object (10) is assigned a wireless communication key (Kme). An authentication server (30) is installed on the network (1) and adapted to determine the key Kme from the identifier (MSISDN). The identifier (MSISDN) of the portable object (10) is sent to the terminal (20) and then from the terminal (20) to the authentication server (30). The authentication server (30) determines the key Kme and allocates the wireless communication key Kme to a calculation unit (30). The calculation unit (30) calculates a session key (Ksession) from the key Kme of the portable object (10) and allocates the key Ksession to the public access terminal (20). The terminal (20) sends the portable object (10) a first message signed using the key Ksession, the portable object (10) acquires the key Ksession from the first message and the key Kme, and authenticates the terminal (20) by verifying the signature of the first signed message. The portable object (10) sends the terminal (20) a second message signed with the key Ksession, and the terminal (20) authenticates the portable object (10) by verifying the signature of the second signed message.

20 Claims, 5 Drawing Sheets

U.S. PATENT DOCUMENTS

| | | |
|---|---|---|
| 6,246,771 B1 * | 6/2001 | Stanton et al. .............. 380/286 |
| 6,611,194 B1 * | 8/2003 | Vieweg et al. ............... 340/5.2 |
| 6,911,974 B2 * | 6/2005 | Asano et al. ................ 345/204 |
| 7,039,946 B1 * | 5/2006 | Binding et al. ................. 726/3 |
| 2002/0036991 A1 | 3/2002 | Inoue |

OTHER PUBLICATIONS

Bleumer et al., "Biometric Authentication and Multilateral Security" AT&T Labs-Research, 1999, XP002201355 Shanon Laboratory, Florham Park, NJ pp. 5-7.

* cited by examiner

METHOD FOR AUTHENTICATION BETWEEN A PORTABLE TELECOMMUNICATION OBJECT AND A PUBLIC ACCESS TERMINAL

RELATED APPLICATIONS

This is a U.S. National Phase Application under 35 USC 371 of International Application PCT/FR02/01860, filed on 3 Jun. 2002.

FIELD OF THE INVENTION

The present invention relates to a method for mutual authentication of a portable telecommunications object and a public access terminal. It also relates to a portable telecommunications object, a public access terminal, and an authentication server all adapted to use said method.

The invention finds one particularly advantageous application in the field of secure telecommunications services, and more especially in the field of securing connections when users seek to access private resources via public access terminals using a portable telecommunications object such as a mobile telephone, a personal digital assistant (PDA), a portable computer, etc.

BACKGROUND OF THE INVENTION

In the above context, the public access terminals include telecommunications means for communicating via a telecommunications network providing users with high bit rate access to their mobile gateway from their portable telecommunications object, for example. The high bit rate access is made possible, firstly, by the capacities (from 512 kbits to 1024 kbits) of the access network, which is preferably an asymmetrical digital subscriber line (ADSL) network, and, secondly, by the capacities (700 kbits) of wireless communications links, whether short-range radio links, such as Bluetooth links, or infrared links. Clearly the respective bit rate capacities of the access networks and the wireless links are similar, which guarantees a high information bit rate throughout the communications channel. The portable telecommunications object and the public access terminal must be equipped with respective wireless communications means, of course.

Access by a user to his mobile gateway can be envisaged in the following manner:

1. The user connects to a public access terminal using his mobile telephone and a Bluetooth link, for example. The terminal and the mobile telephone authenticate each other, the mobile telephone being identified by its mobile subscriber ISDN number (MSISDN), and the user of the mobile telephone is himself optionally authenticated.
2. Using the MSISDN of the mobile telephone, a URL server enables the public access terminal to recover the URL of the mobile gateway of the user. The connection is secured by mutual authentication of the terminal and the server and by encryption and/or authentication of messages using an appropriate protocol, such as the SSL v3 protocol.
3. The public access terminal connects to the gateway transparently by sending it a signed token certifying the identity of the mobile telephone, such as its MSISDN or some other identifier. The SSL v3 protocol enables the public access terminal and the mobile gateway to authenticate each other and where applicable to assure the confidentiality and/or the integrity of information exchanged. The terminal therefore behaves like a trusted third party with respect to the gateway, by guaranteeing authentication of the mobile telephone. If the user is authenticated via the mobile telephone, the telephone then serves as a trusted third party in relation to the terminal and the gateway.
4. When the above steps have been completed, the mobile telephone, and where applicable its user, have been identified to the gateway. The public access terminal then serves as a relay for the users and their gateway: it sends requests to the gateway and returns results to the users.

The question that arises in the above access procedure is whether the public access terminal can authenticate the mobile telephone by means of a Bluetooth wireless call, as in step 1 above.

Although Bluetooth security services, for example, enable secure connections to be set up between a plurality of personal units, the units need to share secret information such as a personal identification number (PIN) in order to be able to do this. The Bluetooth security protocol is therefore insufficient on its own to achieve secure connection of a plurality of users and a public unit. This is because Bluetooth security is designed to cover private usage in which only a few units with a Bluetooth interface can communicate with one another and authenticate one another using secret information that they share. The secret information is the key security factor.

It follows that the recommended implementation of Bluetooth security is not applicable in the context of the invention, as it presupposes a private environment, whereas the authentication of a public access terminal and at least one mobile telephone required in the context of the invention has to be effected in a public environment. Merely sharing secret information is not sufficient to guarantee authentication by the terminal of the individual mobile telephones, since each mobile telephone must have its own secret information, and each public terminal must know that secret information.

SUMMARY OF THE INVENTION

One object of the present invention is to provide a method of mutually authenticating, firstly, a portable telecommunications object assigned a unique identifier and including first wireless communications means and, secondly, a public access terminal including second wireless communications means adapted to cooperate with said first wireless communications means and telecommunications means for communicating via a telecommunications network, the method to be used to set up a secure wireless call between the portable telecommunications object and the public access terminal to assure mutual authentication of the portable object and the terminal and encryption of calls.

This and other objects are attained in accordance with one aspect of the present invention directed to a method that includes the following operations:

assigning said portable telecommunications object a wireless communication key, installing on said telecommunications network an authentication server adapted to determine the wireless communication key of the portable object from said unique identifier, sending the unique identifier of the portable object from the portable object to the public access terminal via said first and second wireless communications means, sending the unique identifier of the portable object from the public access terminal to the authentication server via said telecommunications means, the authentication server determining the wireless communication key of the portable object from the unique identifier sent, the authentication server allocating said wireless communication key to a calculation unit, the calculation unit calculating a session key from said wireless communication key of the portable object, allocating said session key to the public access terminal, the public access terminal sending the portable object a first message signed using the session key via said first and second wireless communications means, the portable object acquiring the session key from the first message and the wireless communication key and authenticating the public access terminal by verifying the signature of said first signed message, and the portable object sending the public access terminal a second message signed with the session key via said first and second wireless communications means, and the public access terminal authenticating the portable object by verifying the signature of said second signed message.

Thus the determination of a cryptographic key, here the session key, by the portable object and by the public access terminal and on the basis of the key of the portable object appropriate to the wireless communications service achieves mutual authentication of the portable object and the terminal, and encrypting the information exchanged assures the confidentiality of the information.

Numerous embodiments of an authentication method of the invention are described in detail hereinafter. A few of them may nevertheless be mentioned at this point.

In particular, the invention provides two ways for the authentication server to determine the wireless communication key of the portable telecommunications object. The first way is for the authentication server to determine the wireless communication key of the portable object from the unique identifier of the portable object and a master key using a diversification mechanism. The second way is for the authentication server to determine the wireless communication key of the portable object from the unique identifier of the portable object by consulting a table.

The invention provides two ways for the portable object to acquire the session key; the session key of the portable object is acquired either by the portable object calculating said session key from said first message and said wireless communication key or by the public access terminal sending the portable object a first signed message containing said session key and encrypted using the wireless communication key of the portable object, which message is decrypted by the portable object.

With regard to calculation of the session key after the authentication server allocates the wireless communication key of the portable object, according to the invention, the session key calculation unit is either the authentication server or the public access terminal.

Finally, it must be pointed out that two configurations can be envisaged for the public access terminal. In a first configuration, the terminal serves only as a relay to the telecommunications network and services are consulted by the user on his own portable object. In the second configuration, the public access terminal has a user interface including a display screen and services are consulted on the screen of the terminal itself. It must be pointed out, however, that the above two configurations are not mutually exclusive, because the terminal with a screen also includes the relay type terminal. In this case, only one user has access to the screen of the terminal, of course, and other users must then use their portable object, within the limitation of the capacity of the terminal to communicate with different portable objects.

Another important aspect of the invention relates to the authentication, not only of the portable object, as explained above, but also of the user himself, to be sure, where necessary, that he is indeed the owner of the unit that he is using.

To this end, the identification method of the invention further includes an operation of authenticating a user by entering secret information specific to said user and comparing the secret information entered with reference secret information.

In a first embodiment, said secret information is a personal code entered by the user, which can be a personal identification number (PIN) as used in particular for securing electronic payment cards. In a second embodiment, said secret information is a biometric characteristic of the user, such as a fingerprint.

After the user enters the secret information, authentication as such is effected either by the portable telecommunications object or by the public access terminal, by comparing it with the reference key.

If said comparison is effected by the portable object, authentication of the user proceeds in the following manner:

1. Entry of his Secret Information by the User.

Two situations have to be envisaged:

a) The user enters his secret information via his portable object.

b) The user enters his secret information via the terminal, which certifies the physical presence of the user at the terminal. In this case, the terminal must have an input unit (biometric sensor, touch-sensitive screen, etc.). The secret information entered is sent in encrypted form to the portable object. By using a random variable, a shared counter, and a time element, an anti-replay mechanism guarantees that the message sent is not an old message. Because the terminal can detect a plurality of portable objects simultaneously, the invention further teaches displaying all portable objects detected on the terminal and requiring the user to select the one he is using, so that the secret information is not sent to all of the portable objects connected. For example, the user recognizes his mobile from its Bluetooth address, its serial number, or any other information distinguishing it from other portable objects. The terminal verifies beforehand that no portable object detected by the terminal has the same identifier.

2. Recovery of the Reference Secret Information.

With this approach, the reference secret information is stored in the portable object or a unit connected to the portable object, such as an additional card, for example a SIM card.

3. Verification of the Secret Information Entered.

The verification is effected in the portable object, which compares the secret information entered to the reference secret information. If the verification result is positive, the portable object sends a confirmation message to the public access terminal. The message is signed by means of a cryptographic method using a public key (digital signature) or by means of a secret information key mechanism using a message authentication method, such as a message authentication code (MAC), thus enabling the terminal to verify the authenticity of the message and that it is not being replayed. The portable object therefore behaves as a trusted unit vis-à-vis the terminal. It is the portable object that certifies that the user is indeed the owner of the portable object.

If said comparison is effected by the public access terminal, authentication of the user proceeds in the following manner:

1. Entry of his Secret Information by the User.

With this approach, the reference secret information is stored in the portable object or a unit connected to the portable object, such as an additional card, for example a SIM card.

Two situations have to be envisaged:

a) The user enters his secret information via the portable object. In this case, the secret information entered is sent in encrypted form to the public access terminal. By using a random variable, a shared counter, and a time element, an anti-replay mechanism guarantees that the message sent is not an old message.

b) The user enters his secret information via the terminal, which certifies the physical presence of the user at the terminal.

2. Recovery of the Reference Secret Information.

Two options are available:

a) The reference secret information, signed if necessary by an entity recognized by the terminal, is stored in the portable object and sent in encrypted form to the terminal. In the first case, to prevent all the portable objects connected systematically having to send the reference secret information to the terminal, the invention teaches requiring the user to select the portable object that he is using.

b) The reference secret information is stored in the authentication server and recovered by the terminal from the unique identifier of the portable object.

3. Verification of the Secret Information Entered.

The public access terminal then compares the secret information entered and the reference secret information to authenticate the user. It can optionally check also that the user is indeed the proprietor of the portable object by consulting the authentication server.

When the above steps have been completed, the portable object and the user have been authenticated, and the terminal is therefore able to allow the recognized user to access the local resources or to certify the identity of the user to remote private resources, such as a mobile gateway, the terminal serving as a trusted intermediary in this case. The information is then either displayed on the screen of the terminal or sent to the user's portable object.

If the user's secret information is a biometric characteristic, the invention teaches holding the reference secret information in the portable object itself, if necessary in signed form, rather than in the authentication server. The signature is that of an entity recognized by the terminal. The aim of this is to avoid storing user physiological data in a database, which could give rise to problems with official bodies responsible for data protection. Furthermore, if authentication is effected by the public access terminal, the reference biometric characteristics must be sent to the terminal which carries out the verification. An alternative would be for the portable object to ask the terminal for the biometric characteristics entered and to effect the verification itself, before sending the reference details to the terminal.

DETAILED DESCRIPTION OF THE DRAWINGS

Figure 1:
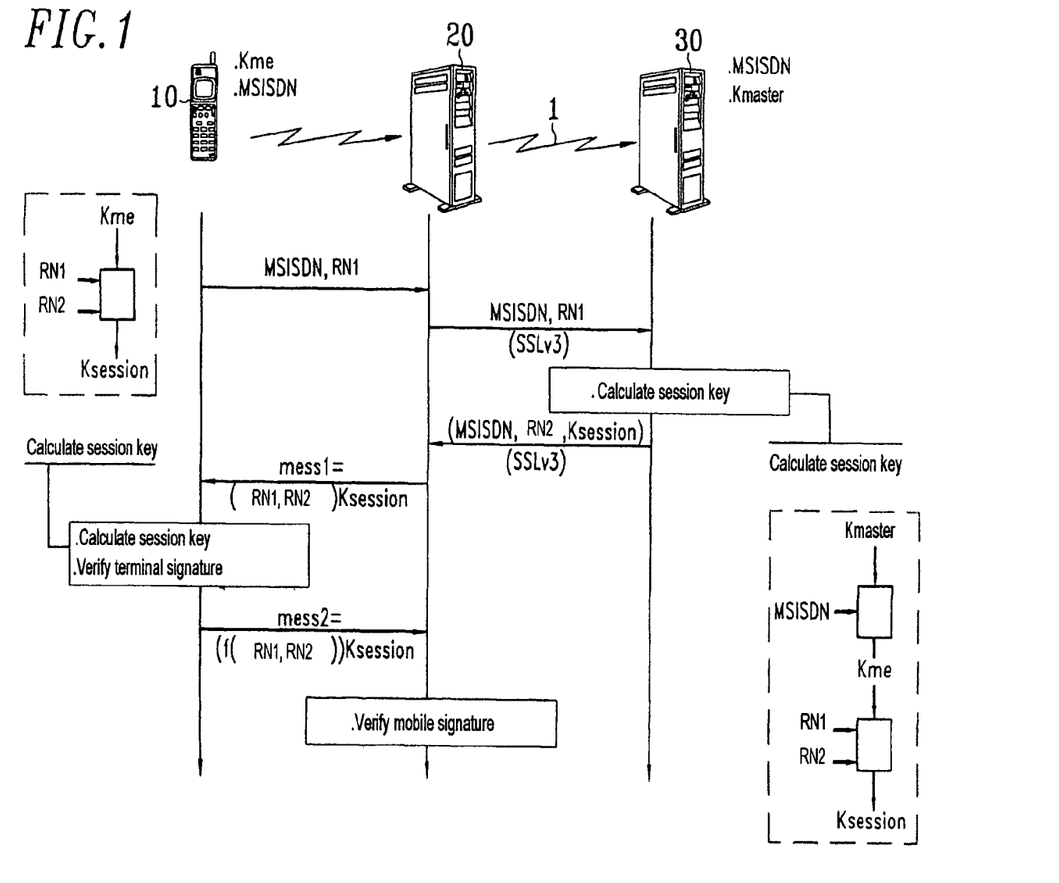
FIG. 1 is a diagram showing a method of mutual authentication of a portable object and a public access terminal.

FIG. 1 is a diagram showing a method of authenticating, firstly, a portable telecommunications object 10, which in the example shown in FIG. 1 is a mobile telephone, referred to hereinafter as a "mobile", and is allocated a unique identifier MSISDN and, secondly, a public access terminal 20 including telecommunications means for communication via a telecommunications network 1.

The mobile 10 and the terminal 20 are adapted to exchange information over a wireless communications link, for example a Bluetooth link. To this end, the mobile and the terminal are respectively provided with first and second wireless communications means.

The mutual authentication of the mobile 10 and the terminal 20 relies on the mobile and the terminal sharing a session key and on a method whose steps are described in detail next.

1. The mobile 10 is allocated a wireless communication key Kme it shares with the terminal 20.
2. An authentication server 30 adapted to determine the wireless communication key Kme of the mobile from the unique identifier MSISDN is installed on the telecommunications network 1.
3. The mobile 10 activates the public access terminal 20 in accordance with the teaching of U.S. patent application Ser. No. 10/311,863 filed Jul. 3, 2001 and having a common assignee.
4. During the connection phase, the mobile 10 generates a first random number RN1 and sends its identifier MSISDN and said first random number RN1 to the terminal 20 via said first and second wireless communications means. This sending can be signed with the key Kme of the mobile or by a trusted authority.
5. In its turn, the terminal 20 sends the unique identifier MSISDN and the random number RN1 to the authentication server 30 via said telecommunications means. The use of a protocol such as the SSL v3 protocol enables mutual authentication of the terminal 20 and the authentication server 30.
6. The authentication server 30 then determines the key Kme of the mobile 10 from its unique identifier. In the FIG. 1 example, the key Kme is determined from the unique identifier MSISDN and a master key Kmaster stored in the authentication server 30, using a diversification mechanism. Another way to determine the key Kme of the mobile 10 is to consult a table storing the keys Kme associated with all the mobiles subscribing to the service.
7. Once it knows the key Kme, the authentication server 30 generates a second random number RN2 and calculates a session key Ksession from the key Kme of the mobile 10 and the two random numbers RN1 and RN2.
8. The authentication server 30 sends back to the public access terminal 20 the session key Ksession, the identifier MSISDN of the mobile 10, and the second random number RN2. The confidentiality of the information is guaranteed by using an encrypted connection, for example a connection using the SSL v3 protocol.
9. The terminal 20 sends the mobile 10 a first message mess1 containing the two random numbers RN1 and RN2 signed with the session key Ksession.
10. The mobile 10 then acquires the session key Ksession by calculating it using the two random numbers contained in the first message mess1 and its wireless communication key Kme stored in the mobile 10 or in the SIM card. The mobile 10 calculates the key Ksession in exactly the same way as the authentication server 30 calculates the same key. The mobile 10 then verifies the signature of the first message mess1 calculated by the terminal 20. On completion of this step, the public access terminal 20 has been authenticated.
11. Finally, the mobile sends the terminal 20 a second message mess2 signed with the session key Ksession. To prevent the risk of replaying, the second message mess2 can be deduced from the two random numbers RN1 and RN2 using a function that must be known to the mobile 10 and the terminal 20. For example, this can simply involve a message containing the two random numbers incremented by 1. The terminal 20 verifies the signature of the second message mess2 sent by the mobile 10. On completion of this step, the mobile 10 has been authenticated.

In the authentication method of the invention described above, the unit for calculating the session key Ksession is the authentication server 30. It must nevertheless be made clear that said calculation unit could equally well be the public access terminal 20 itself, in which case the authentication server 30 would return to the terminal 20 the identifier MSISDN of the mobile 10 accompanied by the key Kme that it has determined. The terminal 20 generates the second random number RN2 and calculates the key Ksession from the key Kme of the mobile 10 and the two random numbers.

Similarly, another way for the mobile 10 to acquire the session key Ksession by calculation is for the public access terminal 20 to send a first signed message containing said key Ksession encrypted with the key Kme of the mobile and for the mobile 10 to decrypt the key Ksession.

Figure 2A:
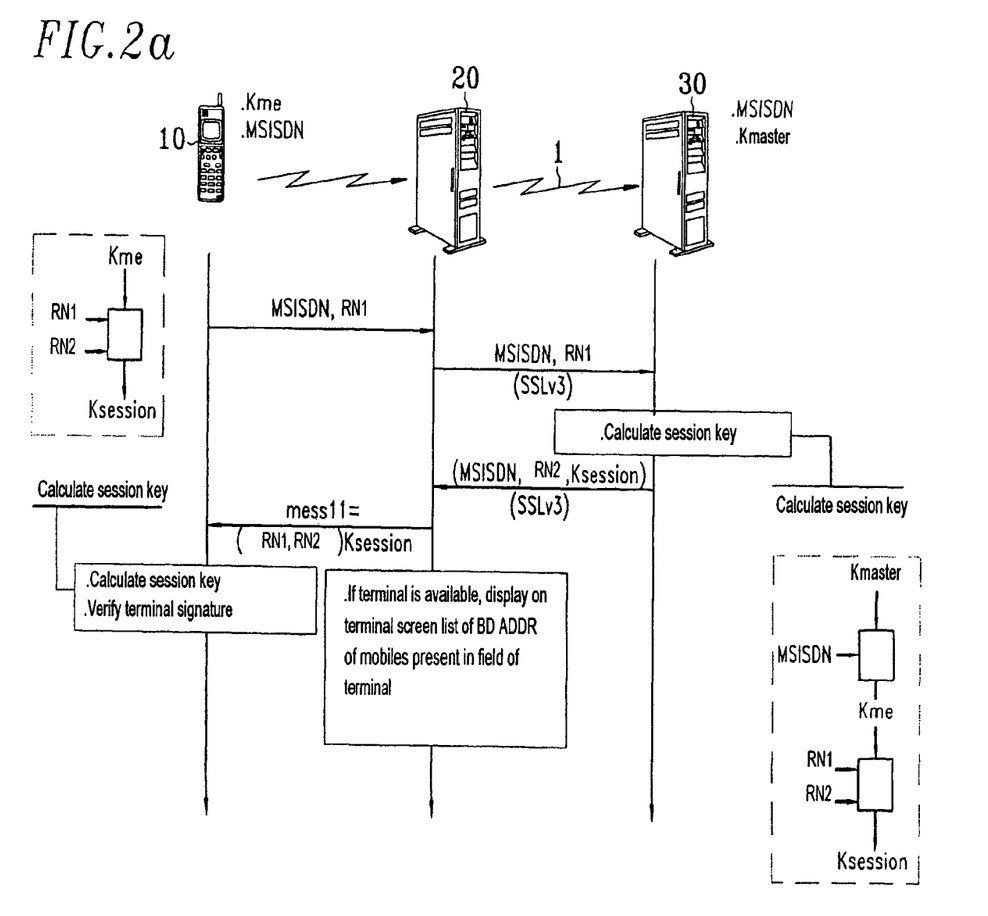
FIG. 2a is a diagram showing a method of authentication of a public access terminal by a portable object.
Figure 2B:
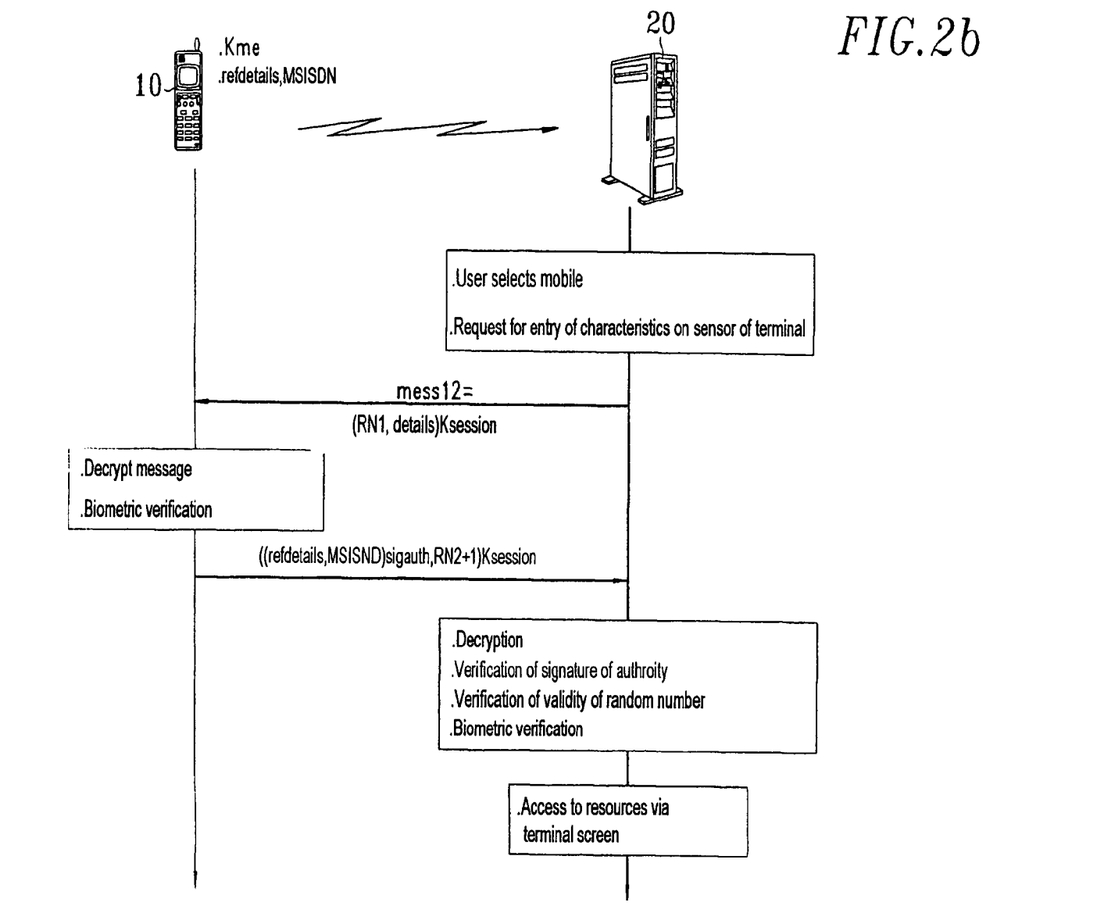
FIGS. 2b and 2c are diagrams showing, in conjunction with FIG. 2a, two methods of authentication of a portable object and its user by a public access terminal.
Figure 2C:
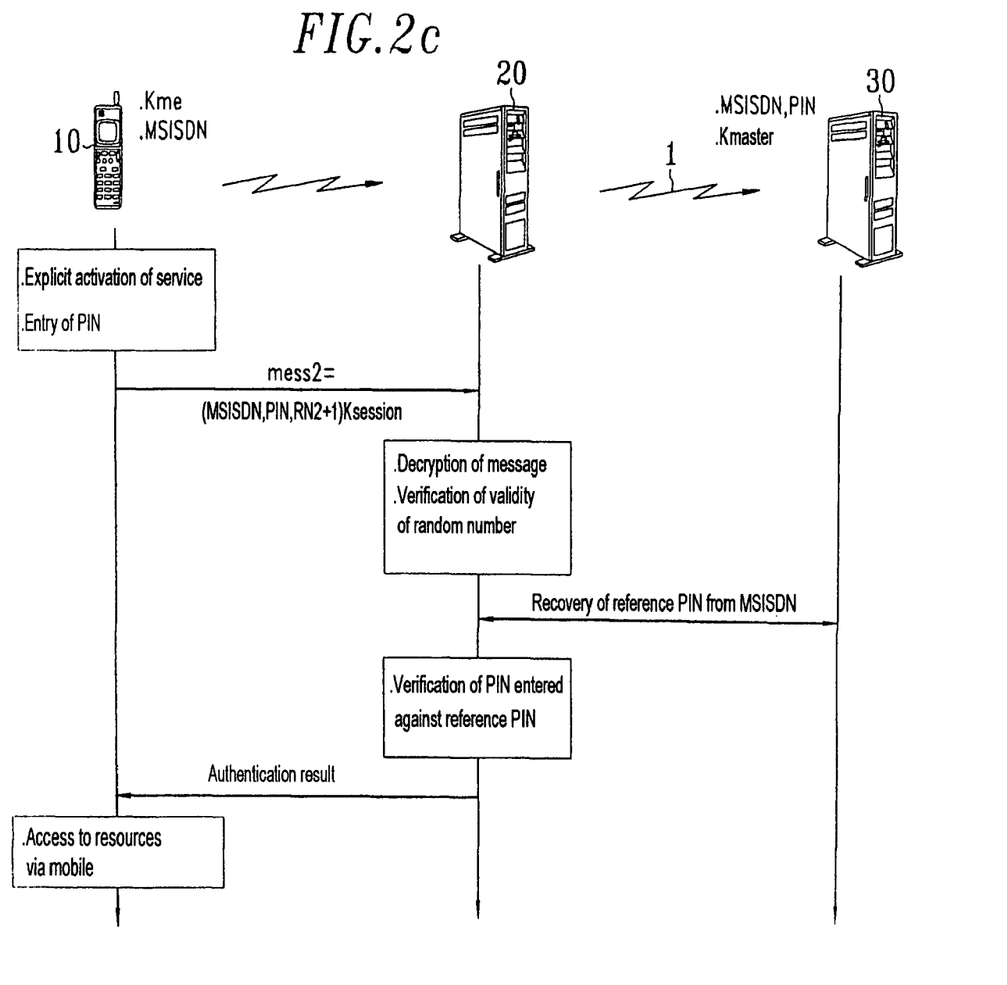

FIGS. 2a, 2b and 2c show two ways of implementing a method of mutual identification of a public access terminal 20 and the user of a mobile 10. Authentication is effected in two stages: the first stage authenticates the terminal and is shown in FIG. 2a and the second stage authenticates the user, and two variants of this stage are shown in FIGS. 2b and 2c. Note that the second stage also enables the terminal 20 to authenticate the mobile 10.

As can be seen in FIG. 2a, the step of authenticating the public access terminal 10 is effected in a similar way to that shown in FIG. 1, namely by sharing a session key Ksession of the mobile 10 and the terminal 20:

1. The mobile 10 sends the terminal 20 its unique identifier MSISDN, its Bluetooth physical address BS ADDR, and a first random number RN1.
2. The terminal 20 sends the authentication server 30 the identifier MSISDN of the mobile 10 and the random number RN1. Using a SSL v3 connection enables mutual authentication of the terminal 20 and the authentication server 30.
3. The authentication server 30 calculates the session key Ksession. It starts by calculating the key Kme specific to the mobile 10 from the master key Kmaster using a diversification mechanism and the identifier MSISDN. It then generates a second random number RN2 and calculates the session key Ksession from the key Kme of the mobile 10 and the two random numbers.
4. The authentication server 30 returns the identifier MSISDN of the mobile 10, the second random number RN2, and the session key Ksession to the terminal 20. The SSL v3 connection guarantees the confidentiality of the information by encryption.
5. The terminal 20 sends the two signed random numbers to the mobile 10 in a first message mess11.
6. The mobile 10 calculates the session key Ksession from its own key Kme and the two random numbers. The session key enables it to verify the signature of the terminal 20 and thus to be sure that the terminal is a trusted terminal.
7. If the screen of the terminal 20 is available, the terminal displays the Bluetooth physical address list BD ADDR of the mobiles within the field of the terminal.

When the above steps have been completed, neither the mobile 10 nor the user has yet been authenticated.

The user has two options for authenticating himself to the public access terminal 20: either biometric authentication via the terminal 20 (FIG. 2b) or PIN authentication via the mobile 10 (FIG. 2c). In both cases, this authentication phase enables the terminal 20 to authenticate the mobile.

If the screen of the terminal 20 is available, biometric authentication via the terminal 20 is effected in the manner shown in FIG. 2b:

1. The user selects his mobile 10 from the list of Bluetooth physical addresses shown on the screen of the terminal 20.
2. The terminal 20 prompts the user to enter his characteristics using the biometric sensor.
3. The terminal 20 sends the mobile 10 the details and the first random number RN1 in a second message mess12 encrypted using the session key Ksession.
4. The mobile 10 decrypts the message mess12, verifies the validity of the random number RN1, and compares the details entered and the reference details. If they match, the user is considered to have been authenticated by the mobile 10.
5. If the user is authenticated, the mobile 10 sends the reference details of the user, the identifier MSISDN signed by an authority recognized by the terminal, and a random number calculated from the second random number RN2 in the terminal 20 in a second message mess2 encrypted using the session key Ksession.
6. The terminal 20 decrypts said second message mess2 and thus authenticates the mobile 10, verifies the signature of the authority, verifies the validity of the random number received, and compares the details entered with the reference details. If the verification result is correct, the terminal 20 considers the user to have been authenticated.
7. The user accesses the resources using the screen of the public access terminal 20.

PIN authentication on the mobile 10, as shown in FIG. 2c, enables users to connect to a terminal 20 either if the terminal is unavailable or because the user does not wish to use the screen of the terminal. In this case, authentication of the user and the terminal 20 proceeds in the following manner:

1. The user requests the connection explicitly, for example by pressing a key on the mobile 10 dedicated to the service.
2. The mobile 10 displays a form for entering the PIN.
3. The mobile 10 sends the terminal 20 its unique identifier MSISDN, the PIN, and a random number calculated from the second random number RN2 in a second message mess2 encrypted using the session key Ksession.
4. The terminal 20 decrypts the message mess2 and thus authenticates the mobile 10 and verifies the validity of the random number received.
5. The terminal 20 interrogates the authentication server 30 to recover the reference PIN of the user from the identifier MSISDN. The use of a SSL v3 connection enables encryption of calls and mutual authentication of the terminal 20 and the authentication server 30.
6. The terminal 20 compares the PIN entered with the reference PIN. If they match, the user is considered to have been authenticated by the terminal.
7. The terminal 20 sends the mobile 10 the authentication result. If the authentication result is correct, the user can access the resources via his mobile 10.

Figure 3:
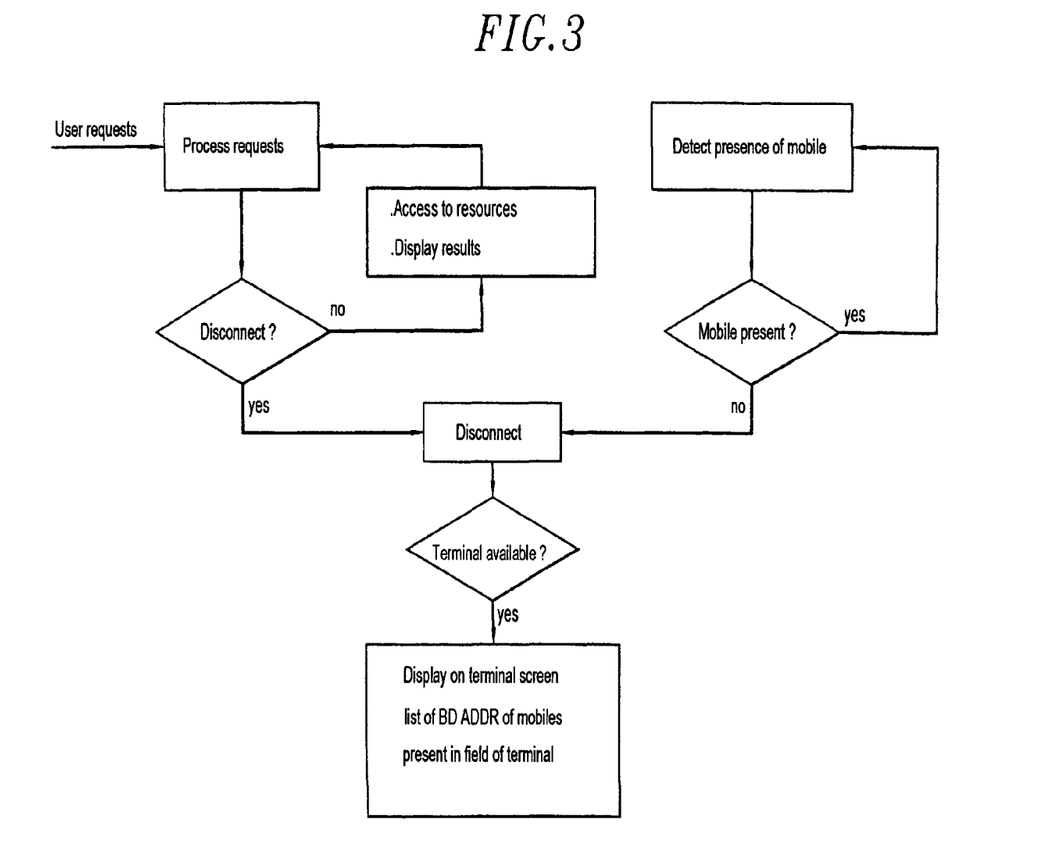
FIG. 3 is a diagram showing the disconnection of a portable object from a public access terminal.

In FIG. 3 it can be seen that disconnection can either be requested explicitly by the user or effected automatically if the mobile 10 leaves the field of the public access terminal 20. In both cases, if the terminal 2 is available, the updated list of Bluetooth physical addresses detected by the terminal 20 is displayed on the screen.

The invention claimed is:

1. A method of mutually authenticating, firstly, a portable telecommunications object assigned a unique identifier and including a first wireless communications unit and, secondly, a public access terminal including a second wireless communications unit adapted to cooperate with said first wireless communications unit and a telecommunications unit for communicating via a telecommunications network, the method comprising:

assigning said portable telecommunications object a wireless communication key;

installing on said telecommunications network an authentication server adapted to determine the wireless communication key of the portable object from said unique identifier;

sending the unique identifier of the portable object from the portable object to the public access terminal via said first and second wireless communications units;

sending the unique identifier of the portable object from the public access terminal to the authentication server via said telecommunications unit;

the authentication server determining the wireless communication key of the portable object from the unique identifier sent;

the authentication server allocating said wireless communication key to a calculation unit;

the calculation unit calculating a session key from said wireless communication key of the portable object and at least one random number;

allocating said calculated session key to the public access terminal;

the public access terminal sending the portable object a first message signed using the session key via said first and second wireless communications units;

the portable object calculating the session key from the at least one random number contained in the first message and the wireless communication key;

authenticating the public access terminal by verifying the signature of said first signed message; and the portable object sending the public access terminal a second message signed with the session key via said first and second wireless communications units and the public access terminal authenticating the portable object by verifying the signature of said second signed message.

2. The method according to claim 1, wherein the authentication server determines the wireless communication key of the portable object from the unique identifier of the portable object and a master key using a diversification mechanism.

3. The method according to claim 1, wherein the authentication server determines the wireless communication key of the portable object from the unique identifier of the portable object by consulting a table.

4. The method according to claim 1, wherein the calculation of the session key by the portable object is identical to the calculation of the session key by the calculation unit.

5. The method according to claim 1, wherein the session key is calculated using the at least one random number that is generated by the portable object and sent to said calculation unit and another random number generated by the calculation unit and sent to the portable object.

6. The method according to claim 5, wherein the first signed message comprises at least said second random number signed with the session key.

7. The method according to claim 1, wherein the portable object acquires the session key by the public access terminal sending the portable object a signed first message containing said session key and encrypted with the wireless communication key of the portable object and the portable object decrypting said message.

8. The method according to claim 1, wherein the unit for calculating the session key is the authentication server.

9. The method according to claim 1, wherein the unit for calculating the session key is the public access terminal.

10. The method according to claim 1, further comprising authenticating a user by entering secret information specific to said user and comparing the secret information entered with reference secret information.

11. The method according to claim 10, wherein the reference secret information is stored in the portable object.

12. The method according to claim 10, wherein the reference secret information is stored in the authentication server.

13. The method according to claim 10, wherein said comparison is effected by the portable object.

14. The method according to claim 10, wherein said comparison is effected by the public access terminal.

15. A portable telecommunications object for implementing a mutual authentication method, the portable telecommunications object having an assigned unique identifier and an assigned wireless communication key, the portable telecommunications object comprising:

a first wireless communications unit configured to receive a first message signed with a session key, a first calculation unit for calculating said session key from at least one random number contained in the first message signed with said session key and the wireless communication key, an authentication unit for authenticating the first message by verifying the signature of said first signed message, and a sending unit for sending a second message signed with the session key via said first wireless communications unit, wherein mutual authentication is effected for, firstly, the portable telecommunications object and, secondly, a public access terminal including a second wireless communications unit adapted to cooperate with said first wireless communications unit and a telecommunications unit for communicating via a telecommunications network, the telecommunications network comprising an authentication server, and wherein the mutual authentication method comprises:

sending the unique identifier of the portable telecommunications object from the portable telecommunications object to the public access terminal via said first and second wireless communications units;

sending the unique identifier of the portable telecommunications object from the public access terminal to the authentication server via said telecommunications unit;

the authentication server determining the wireless communication key of the portable object from the unique identifier sent;

the authentication server allocating said wireless communication key to a second calculation unit;

the second calculation unit calculating a session key from said wireless communication key of the portable object and at least one random number;

allocating said calculated session key to the public access terminal;

the public access terminal sending the portable object a first message signed using the session key via said first and second wireless communications units;

the portable telecommunications object calculating the session key from the at least one random number contained in the first message and the wireless communication key;

authenticating the public access terminal by verifying the signature of said first signed message; and the portable telecommunications object sending the public access terminal a second message signed with the session key via said first and second wireless communications units and the public access terminal authenticating the portable telecommunications object by verifying the signature of said second signed message.

16. The portable telecommunications object according to claim 15, further comprising a random number generator.

17. The portable telecommunications object according to claim 15, further comprising a memory unit for storing reference secret information specific to a user.

18. The portable telecommunications object according to claim 17, further comprising a comparing unit for comparing said reference secret information and secret information entered by the user.

19. A public access terminal for implementing a mutual authentication method, the public access terminal comprising:

a second wireless communications unit;

a telecommunications unit for communicating via a telecommunications network, the telecommunications network comprising an authentication server, a memory unit for storing a session key;

a sending unit for sending a first message comprising at least one random number signed with the session key via said second wireless communications unit; and an authentication unit for authenticating a second message signed with the session key by verifying the signature of said second signed message, wherein mutual authentication is effected for, firstly, a portable telecommunications object including a first wireless communications unit and, secondly, the public access terminal, and wherein the mutual authentication method comprises:

sending the unique identifier of the portable telecommunications object from the portable telecommunications object to the public access terminal via said first and second wireless communications units;

sending the unique identifier of the portable telecommunications object from the public access terminal to the authentication server via said telecommunications unit;

the authentication server determining the wireless communication key of the portable object from the unique identifier sent;

the authentication server allocating said wireless communication key to a calculation unit;

the calculation unit calculating a session key from said wireless communication key of the portable object and at least one random number;

allocating said calculated session key to the public access terminal;

the public access terminal sending the portable object a first message signed using the session key via said first and second wireless communications units;

the portable telecommunications object calculating the session key from the at least one random number contained in the first message and the wireless communication key;

authenticating the public access terminal by verifying the signature of said first signed message; and the portable telecommunications object sending the public access terminal a second message signed with the session key via said first and second wireless communications units and the public access terminal authenticating the portable telecommunications object by verifying the signature of said second signed message.

20. The public access terminal according to claim 19, further comprising a unit for calculating said session key.

* * * * *